United States Patent
Segawa et al.

(10) Patent No.: US 7,769,518 B2
(45) Date of Patent: Aug. 3, 2010

(54) CONTROL OF LOCK-UP CLUTCH

(75) Inventors: Satoshi Segawa, Atsugi (JP); Hiroshi Sekiya, Fuji (JP); Tatsuya Imamura, Fuji (JP); Koji Dohi, Fuji (JP); Kouji Saitou, Fuji (JP)

(73) Assignee: Jatco Ltd, Fuji-shi (JP)

( * ) Notice: Subject to any disclaimer, the term of this patent is extended or adjusted under 35 U.S.C. 154(b) by 860 days.

(21) Appl. No.: 11/262,979

(22) Filed: Nov. 1, 2005

(65) Prior Publication Data

US 2006/0122755 A1 Jun. 8, 2006

(30) Foreign Application Priority Data

Nov. 4, 2004 (JP) ............................... 2004-320797

(51) Int. Cl.
*G06F 19/00* (2006.01)
(52) U.S. Cl. ............................. 701/68; 701/50; 701/60; 701/67; 477/166; 477/174; 477/176; 192/30 R; 192/31; 192/85 R
(58) Field of Classification Search .................... 701/67, 701/68, 51–58, 60; 192/85 R, 30 R, 31, 3.28, 192/3.3, 3.31, 3.32, 3.33; 477/166–176, 477/1
See application file for complete search history.

(56) References Cited

U.S. PATENT DOCUMENTS

| | | | | |
|---|---|---|---|---|
| 5,314,050 A | * | 5/1994 | Slicker et al. ............... | 477/171 |
| 5,332,073 A | | 7/1994 | Iizuka | |
| 5,403,249 A | * | 4/1995 | Slicker ...................... | 477/176 |
| 5,480,363 A | * | 1/1996 | Matsubara et al. ........... | 477/63 |
| 5,630,773 A | * | 5/1997 | Slicker et al. ............... | 477/176 |

(Continued)

FOREIGN PATENT DOCUMENTS

JP 06-174075 A 6/1994

(Continued)

*Primary Examiner*—Dalena Tran
*Assistant Examiner*—Nikhil Sriraman
(74) *Attorney, Agent, or Firm*—Foley & Lardner LLP (57) ABSTRACT

A control device of a lock-up clutch of a torque converter interposed between a transmission and engine used with a vehicle, is disclosed. The control device has a sensor which detects an input rotation speed to the torque converter, a sensor which detects an output rotation speed from the torque converter, a differential pressure control device which controls the differential pressure applied to the lock-up clutch, and a controller which sets a target slip rotation speed of the torque converter; calculates a real slip rotation speed which is a difference between the detected input rotation speed and the detected output rotation speed; and performs feedback control to determine the differential pressure applied to the lock-up clutch so that the real slip rotation speed coincides with the target slip rotation speed. The controller is programmed to: set the target slip rotation speed to a first target slip rotation speed determined from a vehicle running parameter; perform feedback control so that the real slip rotation speed coincides with the first target slip rotation speed; change over the first target slip rotation speed to a second target slip rotation speed according to an error between the first target slip rotation speed and the real slip rotation speed; after changing over, and perform feedback control so that the real slip rotation speed coincides with the second target slip rotation speed; wherein the first and second target slip rotation speeds are different functions of time.

9 Claims, 4 Drawing Sheets

U.S. PATENT DOCUMENTS

| | | | | |
|---|---|---|---|---|
| 5,683,329 | A * | 11/1997 | Kono et al. | 477/176 |
| 5,752,895 | A | 5/1998 | Sugiyama et al. | |
| 5,803,868 | A * | 9/1998 | Kono et al. | 477/168 |
| 6,039,675 | A | 3/2000 | Adachi et al. | |
| 6,482,126 | B2 * | 11/2002 | Kawaguchi | 477/180 |
| 6,565,483 | B2 * | 5/2003 | Segawa et al. | 477/174 |
| 6,652,415 | B2 * | 11/2003 | Segawa et al. | 477/62 |
| 6,828,751 | B2 * | 12/2004 | Sadasivam et al. | 318/729 |
| 6,860,834 | B2 | 3/2005 | Segawa et al. | |
| 7,003,388 | B2 * | 2/2006 | Nakamura | 701/67 |
| 7,058,498 | B2 * | 6/2006 | Kano et al. | 701/67 |
| 7,101,310 | B2 * | 9/2006 | Smith et al. | 477/98 |
| 7,189,188 | B2 * | 3/2007 | Nobumoto et al. | 477/176 |
| 7,228,216 | B2 * | 6/2007 | Inoue | 701/67 |
| 7,373,235 | B2 * | 5/2008 | Werner et al. | 701/67 |
| 2004/0078130 | A1 | 4/2004 | Segawa et al. | |
| 2004/0102289 | A1 * | 5/2004 | Aikawa et al. | 477/176 |
| 2004/0111203 | A1 * | 6/2004 | Higashimata et al. | 701/51 |
| 2005/0037893 | A1 * | 2/2005 | Siebigteroth et al. | 477/176 |

FOREIGN PATENT DOCUMENTS

| | | |
|---|---|---|
| JP | 08-028681 A | 2/1996 |
| JP | 08-233095 A | 9/1996 |
| JP | 09-060720 A | 3/1997 |
| JP | 09-060721 A | 3/1997 |
| JP | 2004-138147 A | 5/2004 |
| JP | 2004-138148 A | 5/2004 |

* cited by examiner

CONTROL OF LOCK-UP CLUTCH

FIELD OF THE INVENTION

This invention relates to a control device which controls the lock-up clutch of a torque converter.

BACKGROUND OF THE INVENTION

In a torque converter provided with a lock-up clutch, control of the front/back differential pressure (lock-up differential pressure) of the lock-up clutch engages and disengages the lock-up clutch. When the torque converter shifts from a converter state to a lock-up state, the lock-up differential pressure may gradually rise from a predetermined initial differential pressure. In this case, the torque converter shifts from the converter state to the slip state via a lock-up state. In the converter state, the lock-up clutch is disengaged, in the slip state, the lock-up clutch slips, and in the lock-up state, the lock-up clutch is fully engaged. This prior art technology is disclosed for example in Tokkai 2004-138147 published by the Japan Patent Office in 2004.

SUMMARY OF THE INVENTION

However, during feedback control of the slip rotation speed in the slip state, if an accelerator pedal depression amount (accelerator displacement amount) increases when the engine rotation speed Ne is falling, the engine rotation speed will increase and the error (deviation) between a target slip rotation speed and a real slip rotation speed will become large.

It is therefore an object of this invention to prevent this shock due to accelerator pedal depression, and the discomfort due to engine rotation speed drop during feedback control.

In order to achieve the above object, this invention provides a control device of a lock-up clutch of a torque converter interposed between a transmission and engine used with a vehicle. The control device comprises a sensor which detects an input rotation speed to the torque converter, a sensor which detects an output rotation speed from the torque converter, a differential pressure control device which controls the differential pressure applied to the lock-up clutch, and a controller. The controller sets a target slip rotation speed of the torque converter; calculates a real slip rotation speed which is a difference between the detected input rotation speed and the detected output rotation speed; and performs feedback control to determine the differential pressure applied to the lock-up clutch so that the real slip rotation speed coincides with the target slip rotation speed. The controller is programmed to: set the target slip rotation speed to a first target slip rotation speed determined from a vehicle running parameter; perform feedback control so that the real slip rotation speed coincides with the first target slip rotation speed; change over the first target slip rotation speed to a second target slip rotation speed according to an error between the first target slip rotation speed and the real slip rotation speed; and after changing over, perform feedback control so that the real slip rotation speed coincides with the second target slip rotation speed. The first and second target slip rotation speeds are different functions of time.

In order to achieve the above object, this invention further provides a control method for use with a control device for controlling of a lock-up clutch of a torque converter interposed between a transmission and engine used with a vehicle. The control method comprises: setting the target slip rotation speed to a first target slip rotation speed determined from a vehicle running parameter; performing feedback control so that the real slip rotation speed coincides with the first target slip rotation speed; changing over the first target slip rotation speed to a second target slip rotation speed according to an error between the first target slip rotation speed and the real slip rotation speed; and performing feedback control so that the real slip rotation speed coincides with the second target slip rotation speed after changing over. The first and second target slip rotation speeds are different functions of time.

The details as well as other features and advantages of this invention are set forth in the remainder of the specification and are shown in the accompanying drawings.

DESCRIPTION OF THE PREFERRED EMBODIMENTS

Figure 1:
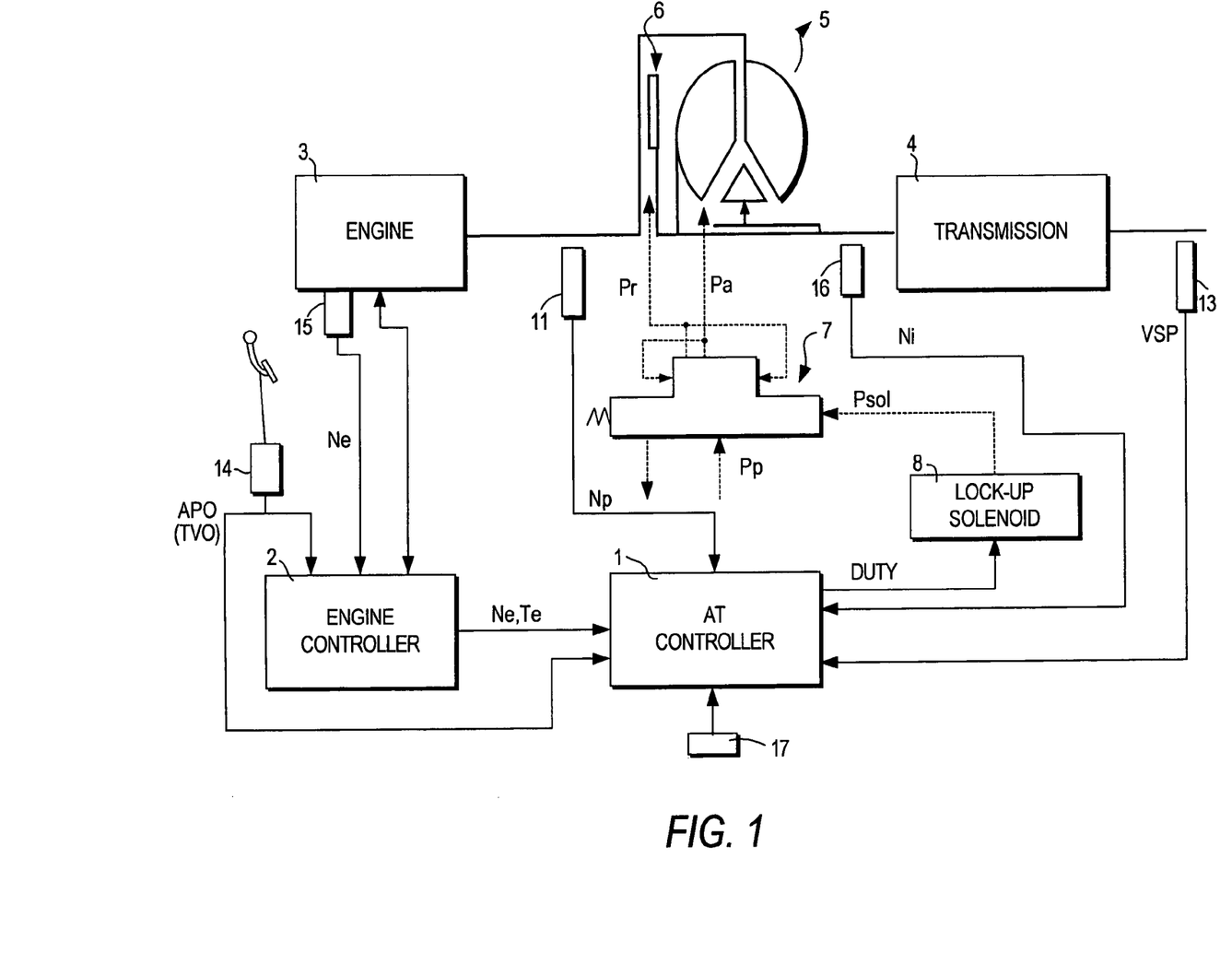
FIG. 1 is a schematic diagram of a vehicle provided with an automatic transmission and a torque converter according to this embodiment.

FIG. 1 shows a vehicle in which is mounted an automatic transmission according to this embodiment. An engine 3 is coupled to a torque converter 5 and the torque converter 5 is coupled to the automatic transmission 4. The torque converter 5 comprises a lock-up clutch 6. The torque converter 5 transmits torque from the engine 3 to the automatic transmission 4 via fluid. The lock-up clutch 6 is selectively brought to a lock-up state (engaged state), a slip state, or an unlock-up state (disengaged state) in accordance with the operational status of the vehicle. The torque converter 5 has incorporated therein the lock-up clutch 6 which is rotated along with a torque converter output element (turbine).

When the lock-up clutch 6 is locked to a torque converter input element (impeller), the torque converter 5 is brought to the lock-up state where the input and output elements are directly coupled to each other. An AT (automatic transmission) controller 1 controls the rotation speed difference between the input and output elements.

The lock-up clutch 6 is operated in accordance with a differential pressure Pa−Pr between a torque converter apply pressure Pa and a torque converter release pressure Pr at both sides (the front and rear) of the lock-up clutch 6. When the release pressure Pr is higher than the apply pressure Pa, the lock-up clutch 6 is disengaged, thus direct coupling is not made between the torque converter input and output elements. When the release pressure Pr is much lower than the apply pressure Pa, the lock-up clutch 6 is locked, and direct coupling is made between the torque converter input and output elements.

When locking the lock-up clutch 6, a locking force, i.e. a lock-up capacity, of the lock-up clutch 6 is determined by the differential pressure Pa−Pr. The larger the differential pressure, the more the locking force of the lock-up clutch 6 increases, thereby increasing the lock-up capacity.

The differential pressure Pa−Pr is controlled by a lock-up control valve 7 which is generally known. The lock-up control valve 7 is, for example, disclosed in U.S. Pat. No. 6,860,834 granted to Segawa, et al. on Mar. 1, 2005, U.S. Pat. No. 5,332,073 granted to Iizuka on Jul. 26, 1994, or U.S. Pat. No. 5,752,895 granted to Sugiyama et al. on May 19, 1998.

According to this embodiment, a lock-up solenoid valve 8 uses a pump pressure Pp as the original pressure to create a signal pressure Psol applied to the lock-up control valve 7 in response to a duty signal DUTY. The lock-up control valve 7 supplies the apply pressure Pa and release pressure Pr to the lock-up clutch 6 according to the signal pressure Psol input from the lock-up solenoid valve 8. In the lock-up control valve 7, the apply pressure Pa and the release pressure Pr act to oppose each other. Further, a biasing force of a spring is added in the same direction as the apply pressure Pa, a biasing force of a spring is added in the same direction as the release pressure Pr, and at the same time the signal pressure Psol is applied in the same direction as the release pressure Pr. The lock-up control valve 7 determines the differential pressure Pa−Pr such that these oil pressures and the biasing forces of the springs are balanced. The lock-up solenoid valve 8 and the lock-up control valve 7 constitute a differential pressure generator which generates a differential pressure added to the lock-up clutch.

The AT (automatic transmission) controller 1 constituted by a microcomputer and the like determines the duty signal DUTY in accordance with the operational status of the vehicle, and controls the differential pressure Pa−Pr by sending the duty signal DUTY to the lock-up solenoid valve 8. The AT controller 1 comprises a microcomputer having a central processing unit (CPU), a random access memory (RAM), a read-only memory (ROM), an input/output (I/O) interface, and a timer. The read-only memory (ROM) may be a programmable ROM.

The AT controller 1 receives signals that indicate a running state of the vehicle and an operational state of the driver. For example, these signals are signals that indicate an input shaft rotational speed Ni of the transmission 4, which is detected by an input shaft rotation sensor 16, a pump impeller rotational speed Np detected by an impeller rotation sensor 11, an accelerator pedal stroke APO (or an opening of a throttle valve TVO) detected by an accelerator pedal stroke sensor 14, a vehicle speed VSP detected by a vehicle speed sensor 13, a speed ration of the transmission 4, and time data from a timer 17 (time measuring means). The input shaft of the transmission 4 corresponds to an output shaft of the torque converter 5, and the rotational speed of the input shaft of the transmission 4 is equivalent to the rotational speed of the output shaft of the torque converter 5. The pump impeller rotational speed Np is equivalent to an input rotational speed (=engine speed Ne) inputted to the torque converter 5. Further, the AT controller 1 receives signals indicative of the engine speed Ne and engine torque Te from an engine controller 2. The AT controller 1 controls locking, release, or slippage of the lock-up clutch 6 by means of these signals. The engine speed Ne is detected by an engine speed sensor 15 and is input to the engine controller 2.

The engine controller 2 comprises a microcomputer having a central processing unit (CPU), a random access memory (RAM), read-only memory (ROM), and an input/output (I/O) interface. The engine controller 2 and the AT controller 1 may be integrated to be a single controller.

An AT controller 1 performs slip control (feedback control) which determines a duty signal DUTY supplied to a lock-up solenoid valve 8 (i.e., a differential pressure Pa−Pr) so that the feed-back real slip rotation speed coincides with a target slip rotation speed, and open loop control is performed which determines the duty signal DUTY without using feedback of the slip rotation speed.

Figure 2A:
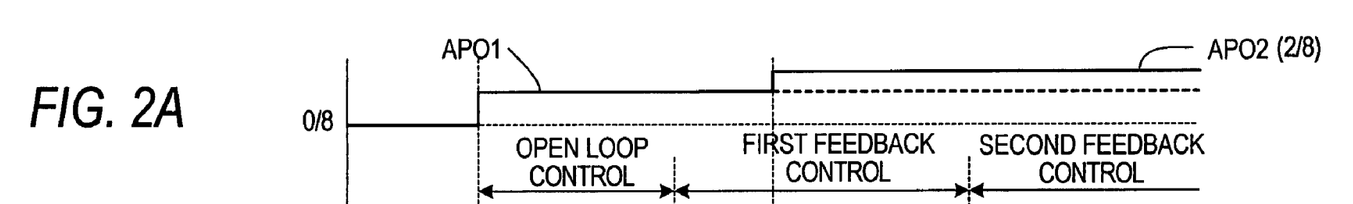
FIG. 2A is a time chart of an accelerator pedal depression amount.
Figures 2B, 2C:
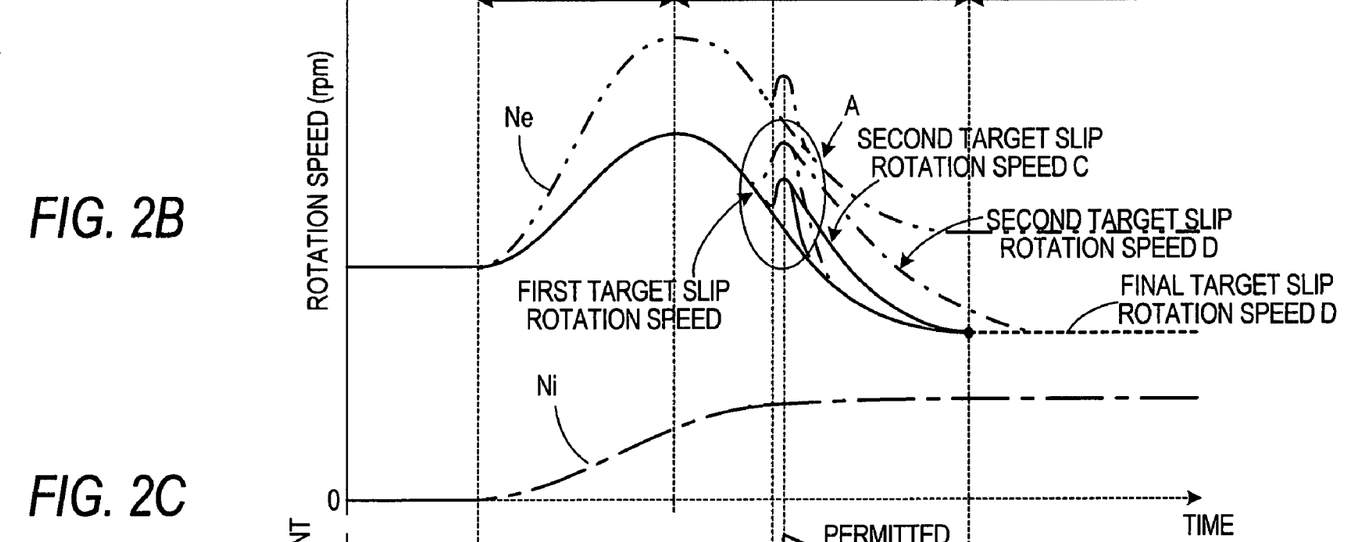
FIG. 2B is a time chart of an engine rotation speed and first and second target slip rotation speeds.
FIG. 2C is a time chart of an input rotation speed to the transmission.
Figure 2D:
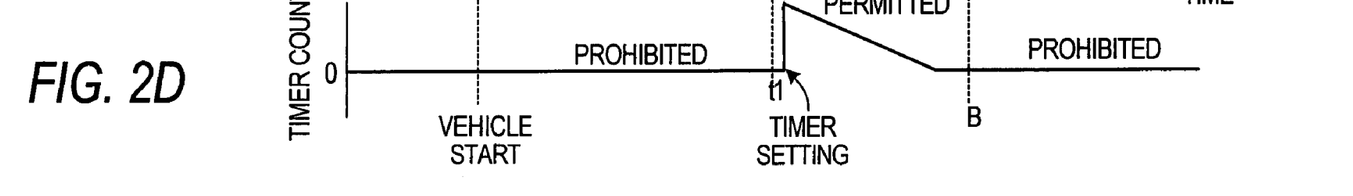
FIG. 2D is a time chart of a timer counter value.
Figure 3A:
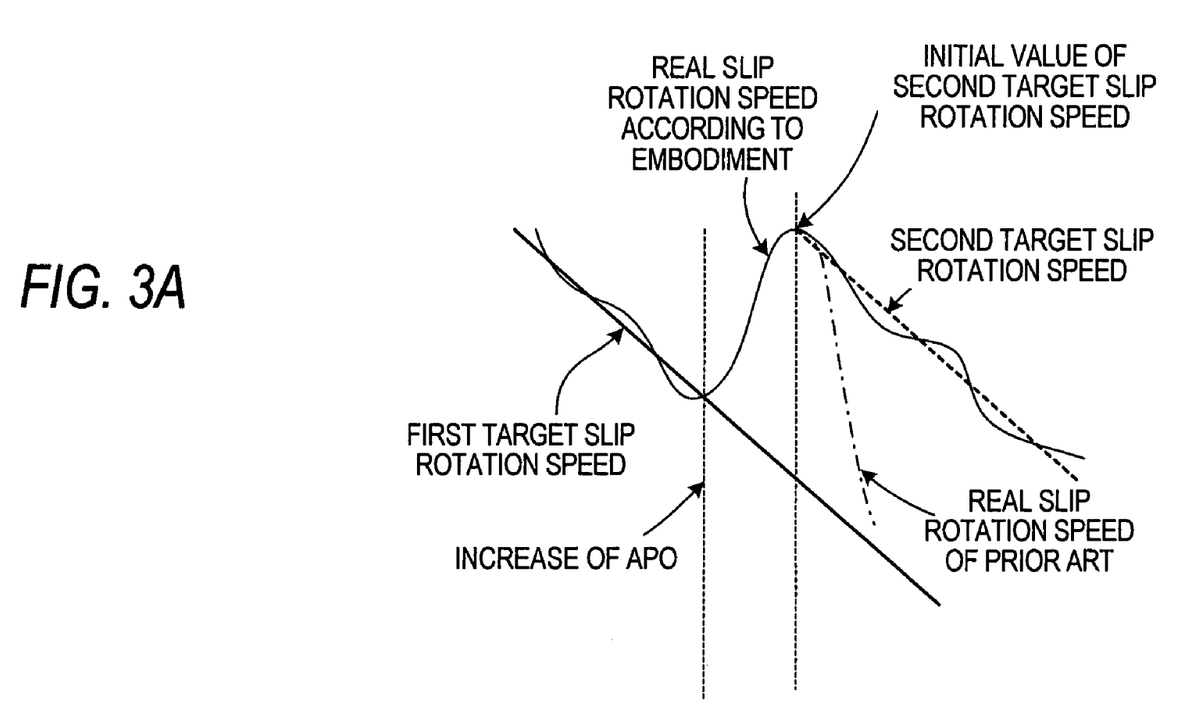
FIG. 3A is a time chart showing an enlargement of part of FIG. 2.
Figure 3B:
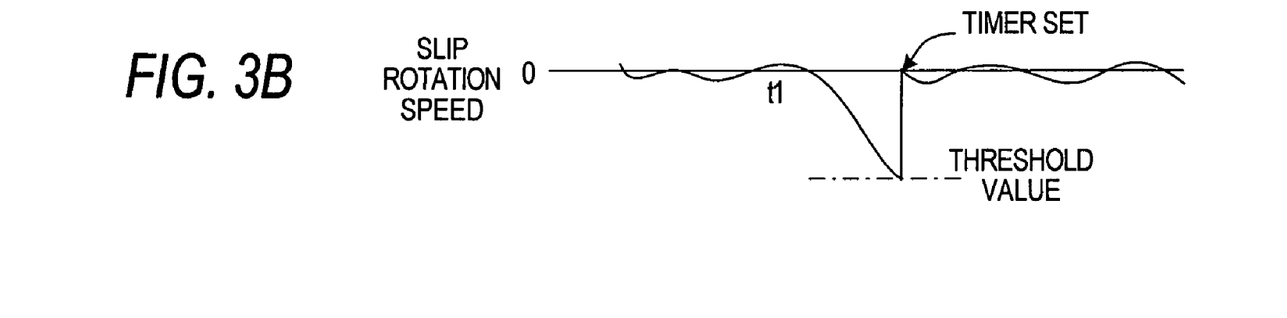
FIG. 3B is a time chart showing an error of a slip rotation speed.

Referring to FIG. 2 and FIG. 3, the slip control (feedback control) performed during a period from the end of open loop control to the beginning of a slip lock-up region, will be described. The slip lock-up region is defined as a control region where feedback control, which determines the duty signal DUTY to make the slip rotation speed coincide with the final target slip rotation speed at a predetermined throttle valve opening (predetermined accelerator pedal depression amount), is performed. The time chart of FIG. 2 shows an accelerator depression amount APO (FIG. 2A) from vehicle start time until the beginning of the slip lock-up state, engine rotation speed (FIG. 2B), input shaft rotation speed Ni of the automatic transmission (FIG. 2C) and timer count state (FIG. 2D). FIG. 3A is an enlarged detail of a part "A" of FIG. 2. FIG. 3B shows the control error of the slip rotation speed.

Referring to FIG. 2, open loop control which is performed for a predetermined time switches over to a first feedback control. A first feedback control region is where feedback control is performed such that the real slip rotation speed which increased by open loop control, becomes a first target slip rotation speed. Here, the first target slip rotation speed is set based on the vehicle running parameters such as vehicle speed VSP, input shaft rotation speed Ni of the automatic transmission, accelerator depression amount APO (throttle opening TVO) and speed ratio of the automatic transmission, as in the prior art (for example, U.S. Pat. No. 6,652,415 granted to Segawa et al. on Nov. 25, 2003). The target slip rotation speed may be set on the basis of a difference value between the input shaft rotation speed Ni, and the target engine rotation speed which is determined based on the vehicle speed VSP and accelerator depression amount APO, as shown in U.S. Pat. No. 6,860,834 granted to Segawa et al. on Mar. 1, 2005. The ROM of the AT controller 1 stores a first lookup map (or lookup table) which defines the first target slip rotation speed as a function of the vehicle running parameters.

Second feedback control is feedback control performed after the real slip rotation speed becomes the final target slip rotation speed. In other words, second feedback control is control in the slip lock-up region. The AT controller 1 may set the value of the final target slip rotation speed (for example 0 rpm). The final target slip rotation speed is a target slip rotation speed which does not vary for each control cycle of slip control, i.e., it is a target slip rotation speed which does not vary with time.

Immediately after vehicle startup, the open loop control of the AT controller 1 increases the engine rotation speed Ne and input shaft rotation speed Ni. Next, the AT controller 1 changes over open loop control to feedback control. The feedback control of the AT controller 1 determines the duty signal DUTY supplied to the lock-up solenoid valve 8 so that the real slip rotation speed coincides with the target slip rotation speed. Here, the real slip rotation speed is the difference between the detected engine rotation speed Ne and detected input shaft rotation speed Ni. Here, the engine rotation speed Ne has a tendency to decrease due to feedback control, and after the input shaft rotation speed Ni reaches its target desired value, it is maintained at a fixed rotation speed.

At a time t1 when the engine rotation speed Ne decreases due to first feedback control, if the depression amount APO (i.e., the throttle opening TVO) of the accelerator pedal increases from a first depression amount APO 1 to a second depression amount APO2 (e.g. ⅔), the engine rotation speed Ne and real slip rotation speed will rise. According to the prior art, as the dashed-dotted line of FIG. 3A shows, the real slip rotation speed falls rapidly so that it coincides with the target slip rotation speed. A shock occurs because of the sudden change of the engine rotation speed Ne.

According to this embodiment, when the control error between the target slip rotation speed and real slip rotation speed (=target slip rotation speed−real slip rotation speed) falls below a threshold value (e.g. −200 rpm), the AT controller 1 changes over the target slip rotation speed from the first target slip rotation speed to the second target slip rotation speed. The ROM of the AT controller 1 stores a second lookup map which defines the second target slip rotation speed as a function of the vehicle running parameters such as vehicle speed VSP, input shaft rotation speed Ni of the automatic transmission, accelerator depression amount APO (throttle opening TVO) and speed ratio of the automatic transmission, whereby the second target slip rotation speed is set based on the vehicle running parameters. Since the first and second lookup maps are different, the second target slip rotation speed has a different time dependence from that of the first target slip rotation speed, i.e. the first and second target slip rotation speeds are different functions of time. Otherwise, the ROM of the AT controller 1 stores a second lookup map which defines the second target slip rotation speed as a function of time, whereby the second target slip rotation speed is set directly based on the elapsed time from the change-over of the target slip rotation speed.

Hereafter, the second target slip rotation speed will be described. The initial value of the second target slip rotation speed when the target slip rotation speed is changed over, is set such that it depends on the first target slip rotation speed and accelerator depression amount APO (or throttle opening TVO) when the target slip rotation speed is changed over. For example, the initial value is set to be larger, the larger the accelerator depression amount APO is.

From the viewpoint of preventing shock, the AT controller 1 limits the absolute value of the variation rate of the second target slip rotation speed to be equal to or less than a predetermined value (e.g., 200 rpm/sec). The RAM of the AT controller 1 may sequentially store the second target slip rotation speeds set on the basis of the vehicle running parameters, and the AT controller 1 may calculate the variation rate of the second target slip rotation speed. When the absolute value of the variation rate of the second target slip rotation speed is larger than a predetermined value, the AT controller 1 may reset the second target slip rotation speed to make the present second target slip rotation speed approach an immediately previous value of the second target slip rotation speed, thereby limiting the absolute value of the variation rate of the second target slip rotation speed.

The time "B", at which the first feedback control is changed over to the second feedback control, depends on, for example, the real slip rotation speed when first feedback control starts. The time "B" shows the time of reaching the final target slip rotation speed, i.e., the start time of the slip lock-up control region. From the viewpoint of improving fuel consumption, the time "B" at which control is changed over to second feedback control, is preferably as early as possible. Therefore, the second target slip rotation speed is preferably set to coincide with the first target slip rotation speed by the time "B". The variation rate of the second target slip rotation speed may be set with the conditions that the absolute value of the variation rate is equal to or less than a predetermined value, and that the second target slip rotation speed coincides with the first target slip rotation speed by the time "B" (shown by C in FIG. 2).

However, when for example the accelerator pedal depression amount is large, even if the absolute value of the variation rate of the second target slip rotation speed is maintained at a maximum value, the second target slip rotation speed does not become the final target slip rotation speed at the point "B" (shown by D in FIG. 2). In such a case, it is permitted that the maximum value is maintained and the change-over timing to second feedback control is delayed. This is in order to give more priority to preventing the driver from experiencing a shock than to maintenance of fuel consumption.

The second target slip rotation speed may be set to converge to the target slip rotation speed in the slip lock-up region without overshoot near the time "B". The target slip rotation speed after the time "B" may be set to zero.

Further, the variation rate of the second target slip rotation speed can be set to be identical to the variation rate of the first target slip rotation speed during at least a predetermined period from when the target slip rotation speed is changed over. This can be done by setting the variation of the second target slip rotation speed with respect to vehicle running parameters in the second lookup map to be equal to the variation of the first target slip rotation speed with respect to vehicle running parameters in the first lookup map. Thus, a rapid change of the second target slip rotation speed is prevented.

In this embodiment, the case was described where the accelerator pedal depression amount increases during an engine rotation speed drop as an example, but it will be understood that the invention can be applied also when the accelerator pedal depression amount decreases (however, the accelerator pedal depression amount does not decrease to 0).

Figure 4:
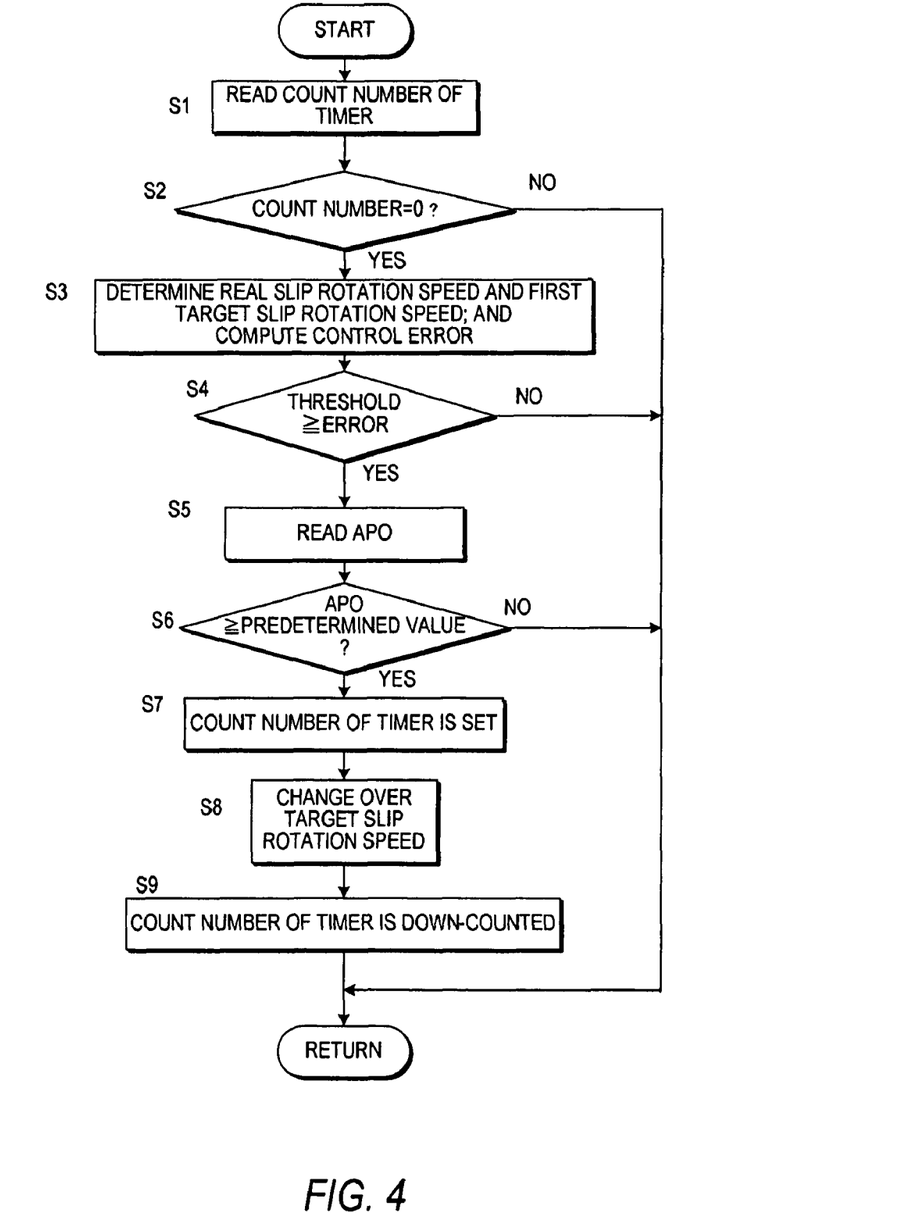
FIG. 4 is a flow chart showing a control routine executed by the controller of this embodiment.

Referring to the flow chart of FIG. 4, the control routine performed by the AT controller 1 will now be described. This control routine is executed by a timer interrupt during slip control at a fixed interval (e.g., several tens of milliseconds).

In a step S1, the count number of a timer 17 is read. Next, in a step S2, it is determined whether or not the read count number is 0. If the count number is not 0, since change-over of the target slip rotation speed is prohibited, the routine is terminated. If the count number is 0, the routine proceeds to a step S3. It should be noted that the count number cannot be negative.

In the step S3, the real slip rotation speed is computed from the engine rotation speed Ne and input shaft rotation speed Ni, and the first target slip rotation speed is set from the vehicle running parameters such as vehicle speed, input shaft rotation speed Ni, accelerator depression amount APO and speed ratio of the automatic transmission. The error between the first target slip rotation speed and real slip rotation speed is then computed.

Next, in a step S4, the computed slip rotation speed error is compared with the threshold (e.g. −200 rpm), and it is determined whether or not the error is equal to or less than the threshold. If the error is equal to or less than the threshold, the routine proceeds to a step S5, and if the error is larger than the threshold, the routine is terminated. In the step S5, the accelerator depression amount APO is read.

Next, in a step S6, it is determined whether or not the read accelerator depression amount APO is equal to or more than a predetermined value (e.g. ⅔). If the accelerator depression amount APO is equal to or more than the predetermined value, the routine proceeds to a step S7. If the accelerator depression amount APO is less than the predetermined value, change-over of the target slip rotation speed is unnecessary, so the routine is terminated. Since change-over of the target slip rotation speed is permitted only when the accelerator depression amount APO is equal to or more than the predetermined value, even if there are frequent minute increases or decreases of the accelerator depression amount APO, change-over of the target slip rotation speed is not permitted. Therefore, the delay of the shift to the slip lock-up region is suppressed.

In the step S7, the count number of the timer 17 is set to an initial value corresponding to a predetermined time (e.g. several seconds). Next, in a step S8, the target slip rotation speed is changed over from the first target slip rotation speed to the second target slip rotation speed.

Next, in a step S9, the count number of the timer 17 is down-counted (decreased). Here, the count number of the timer 17 has the initial value corresponding to the predetermined time when change-over of the target slip rotation speed is permitted, and change-over is not permitted until the predetermined time has elapsed. In this way, by providing a change-over prohibition period of the predetermined time, even if accelerator pedal depression and return is performed frequently, delay in the shift to the slip lock-up region can be suppressed to the minimum. The timer 17 may be either a timer provided in the microcomputer of the AT controller 1 or a timer provided separately from the AT controller 1.

As mentioned above, the target slip rotation speed is changed over from the first target slip rotation speed to the second target slip rotation speed according to the error between the first target slip rotation speed and real slip rotation speed. Therefore, shocks are suppressed even if the accelerator pedal depression amount increases and the error between the first target slip rotation speed and real slip rotation speed becomes large. Further, since the shift period to the slip lock-up region is adjusted, deterioration of fuel consumption can be suppressed.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire contents of Japanese Patent Application P2004-320797 (filed Nov. 4, 2004) are incorporated herein by reference.

What is claimed is:

1. A control device of a lock-up clutch of a torque converter interposed between a transmission and engine used with a vehicle, comprising:
   a sensor which detects an input rotation speed to the torque converter,
   a sensor which detects an output rotation speed from the torque converter,
   a differential pressure control device which controls the differential pressure applied to the lock-up clutch, and
   a controller which sets a target slip rotation speed of the torque converter; calculates a real slip rotation speed which is a difference between the detected input rotation speed and the detected output rotation speed; and performs feedback control with the target slip rotation speed to determine the differential pressure applied to the lock-up clutch,
   the controller being programmed to:
   set the target slip rotation speed to a first target slip rotation speed determined from a vehicle running parameter, wherein the first target slip rotation speed is a first function of time;
   perform feedback control with the first target slip rotation speed;
   change over the target slip rotation speed from the first target slip rotation speed to a second target slip rotation speed when an error, which is defined as the first target slip rotation speed minus the real slip rotation speed, falls below a threshold value and when the error takes a minus value; wherein the second target slip rotation speed is a second function of time and converges to a final target slip rotation speed, and wherein an initial value of the second target slip rotation speed is larger than the value of the first target slip rotation speed when the target slip rotation speed is changed over; and
   after changing over, perform feedback control with the second target slip rotation speed;
   wherein the value of the second target slip rotation speed coincides with the value of the first target slip rotation speed before the second target slip rotation speed becomes the final target slip rotation speed.

2. The control device as defined in claim 1, wherein the controller performs open loop control of the slip rotation speed before the feedback control with the first target slip rotation speed.

3. The control device as defined in claim 1, further comprising a sensor which detects an accelerator pedal depression amount,
   wherein the controller is programmed to change over the target slip rotation speed from the first target slip rotation speed to the second target slip rotation speed when the detected accelerator pedal depression amount is equal to or more than a predetermined amount.

4. The control device as defined in claim 3, wherein the controller is further programmed to change over the target slip rotation speed from the first target slip rotation speed to the second target slip rotation speed when the detected accelerator pedal depression amount has increased or decreased to a predetermined value.

5. The control device as defined in claim 1, comprising a timer which measures an elapsed time from when the controller has changed over the target slip rotation speed from the first target slip rotation speed to the second target slip rotation speed,
   wherein the controller is programmed to prohibit change-over from the first target slip rotation speed until the elapsed time reaches a predetermined time.

6. The control device as defined in claim 1, further comprising a sensor which detects an accelerator pedal depression amount,
   wherein the controller is programmed to set the initial value of the second target slip rotation speed according to the detected accelerator pedal depression amount when the target slip rotation speed is changed over.

7. The control device as defined in claim 1, wherein the controller is programmed to set the initial value of the second target slip rotation speed to be equal to the real slip rotation speed when the target slip rotation speed is changed over.

8. A control device of a lock-up clutch of a torque converter interposed between a transmission and engine used with a vehicle, comprising:
   means for detecting an input rotation speed to the torque converter,
   means for detecting an output rotation speed from the torque converter,
   differential pressure control means for controlling the differential pressure applied to the lock-up clutch, and
   a controller which sets a target slip rotation speed of the torque converter; calculates a real slip rotation speed which is a difference between the detected input rotation speed and the detected output rotation speed; and performs feedback control with the target slip rotation speed to determine the differential pressure applied to the lock-up clutch, the controller comprising:

setting means for setting the target slip rotation speed to a first target slip rotation speed determined from a vehicle running parameter, wherein the first target slip rotation speed is a first function of time;

feedback control means for performing feedback control with the first target slip rotation speed;

switching means for switching the target slip rotation speed from the first target slip rotation speed to a second target slip rotation speed, when an error, which is defined as the first target slip rotation speed minus the real slip rotation speed, falls below a threshold value and when the error takes a minus value; wherein the second target slip rotation speed is a second function of time and converges to a final target slip rotation speed, and wherein an initial value of the second target slip rotation speed is larger than the value of the first target slip rotation speed when the target slip rotation speed is switched; and feedback control means for performing feedback control with the second target slip rotation speed after switching the target slip rotation speed from the first target slip rotation speed to the second target slip rotation speed;

wherein the value of the second target slip rotation speed coincides with the value of the first target slip rotation speed before the second target slip rotation speed becomes the final target slip rotation speed.

9. A control method for use with a control device for controlling of a lock-up clutch of a torque converter interposed between a transmission and engine used with a vehicle, the control device comprising:

a sensor which detects an input rotation speed to the torque converter, a sensor which detects an output rotation speed from the torque converter, a differential pressure control device which controls the differential pressure applied to the lock-up clutch, and a controller which sets a target slip rotation speed of the torque converter; calculates a real slip rotation speed which is a difference between the detected input rotation speed and the detected output rotation speed; and performs feedback control with the target slip rotation speed to determine the differential pressure applied to the lock-up clutch, the control method comprising:

setting the target slip rotation speed to a first target slip rotation speed determined from a vehicle running parameter, wherein the first target slip rotation speed is a first function of time;

performing feedback control with the first target slip rotation speed;

changing over the target slip rotation speed from the first target slip rotation speed to a second target slip rotation speed when an error, which is defined as the first target slip rotation speed minus the real slip rotation speed, falls below a threshold value and when the error takes a minus value; wherein the second target slip rotation speed is a second function of time and converges to a final target slip rotation speed, and wherein an initial value of the second target slip rotation speed is larger than the value of the first target slip rotation speed when the target slip rotation speed is changed over; and performing feedback control with the second target slip rotation speed after changing over;

wherein the value of the second target slip rotation speed coincides with the value of the first target slip rotation speed before the second target slip rotation speed becomes the final target slip rotation speed.

* * * * *